(12) United States Patent
Shuen

(10) Patent No.: US 6,450,470 B1
(45) Date of Patent: Sep. 17, 2002

(54) DETACHABLE FIXING SEAT

(75) Inventor: Shun-Tian Shuen, San Chung (TW)

(73) Assignee: Janchy Enterprise Co., Ltd., Taipei (TW)

( * ) Notice: Subject to any disclaimer, the term of this patent is extended or adjusted under 35 U.S.C. 154(b) by 11 days.

(21) Appl. No.: 09/837,464

(22) Filed: Apr. 19, 2001

(51) Int. Cl.[7] ............................................... A47B 95/00
(52) U.S. Cl. .............................. 248/346.01; 248/346.03
(58) Field of Search ...................... 248/346.03, 346.04, 248/469, 473, 477, 479, 346.06, 346.5, 314, 310, 205.4

(56) References Cited

U.S. PATENT DOCUMENTS

| | | | | |
|---|---|---|---|---|
| 1,663,822 A | * | 3/1928 | Walker | 211/74 |
| 2,748,952 A | * | 6/1956 | Fleit et al. | 211/74 |
| 2,765,907 A | * | 10/1956 | Dunning et al. | 206/52 |
| 2,963,167 A | * | 12/1960 | Norman | 211/74 |
| 3,365,761 A | * | 1/1968 | Kalvig | 24/257 |

* cited by examiner

Primary Examiner—Leslie A. Braun
Assistant Examiner—A. Joseph Wujciak
(74) Attorney, Agent, or Firm—Bacon & Thomas, PLLC (57) ABSTRACT

Detachable fixing seat including a detachable fixing seat and a decorative article. The fixing seat is composed of an upper and a lower boards engaged with each other. The surface of the lower board is formed with a central circular hole in which two opposite connecting wings are formed. The bottom face of the lower board is provided with double-face adhesive tape for adhering to a certain place. The upper board is formed with a central through hole in which two opposite projecting tongues are formed for engaging with the connecting wings of the lower board. The decorative article can have various patterns. The bottom of the decorative article is locked with the upper board by screws and the upper board is quickly engaged with the lower board so that the decorative article can be easily detachably associated with the fixing seat.

5 Claims, 13 Drawing Sheets

DETACHABLE FIXING SEAT

BACKGROUND OF THE INVENTION

The present invention is related to a detachable fixing seat which can be freely fixed at a desired place and a decorative article can be easily detachably associated with the fixing seat.

A mini type decorative article is generally fixed at a desired place by an adhesive or screws. Such fixing measure makes it impossible to detach or replace the decorative article. Therefore, after a period of use and a user desires to replace the decorative article with another, the user must forcedly detach the decorative article. This often leads to damage of the decorative article and results in waste.

SUMMARY OF THE INVENTION

It is therefore a primary object of the present invention to provide a detachable fixing seat which enables a user to freely detachably fix a decorative article at a desired place. The decorative article can be firmly located on the fixing seat and freely detached and replaced by another decorative article as desired without damaging the decorative article.

It is a further object of the present invention to provide the above detachable fixing seat on which various patterns of decorative articles can be replaceably fixed as desired to achieve complex effect.

The present invention can be best understood through the following description and accompanying drawings wherein:

DETAILED DESCRIPTION OF THE PREFERRED EMBODIMENTS

Figure 1:
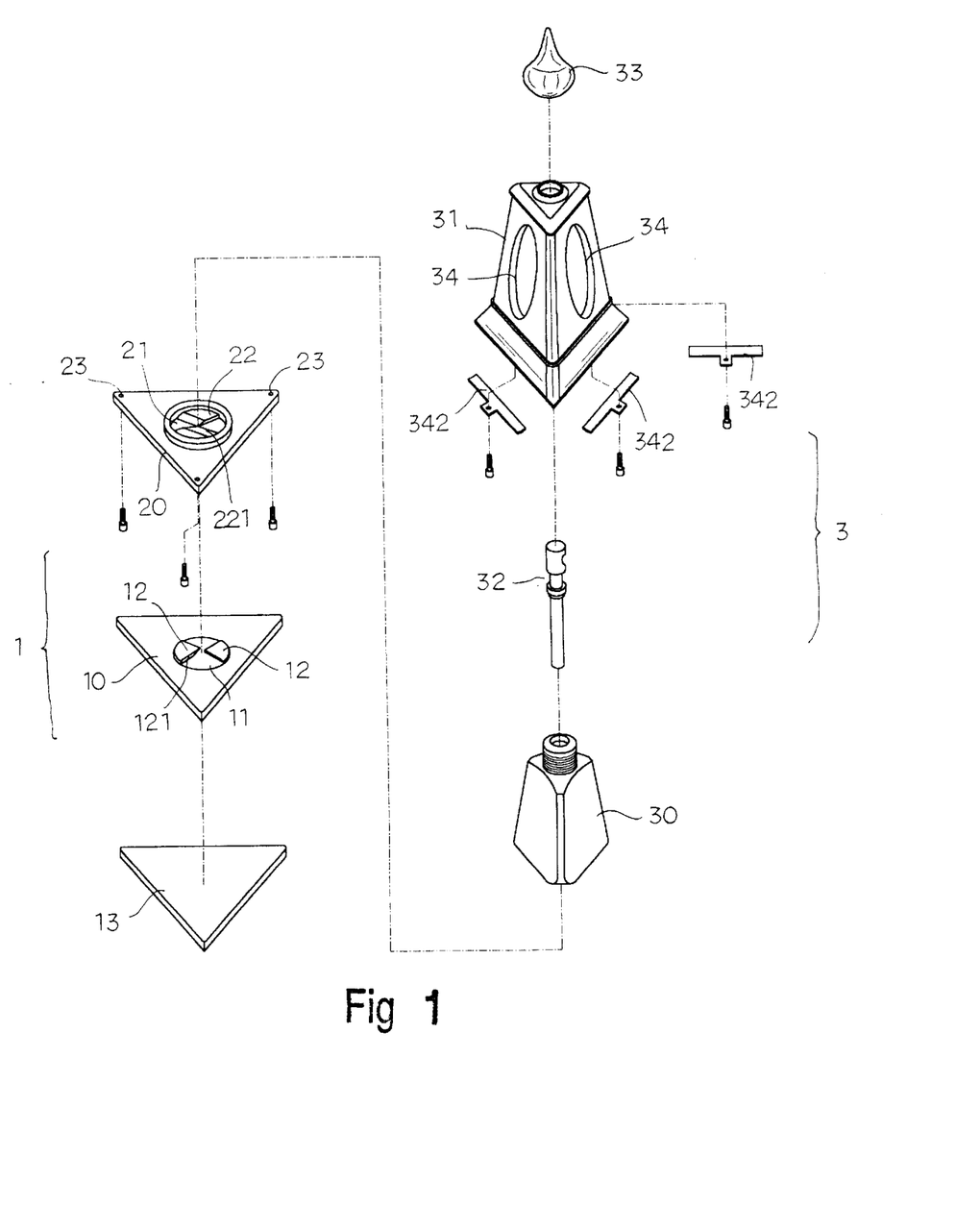
FIG. 1 is a perspective exploded view of a first embodiment of the present invention.
Figure 2:
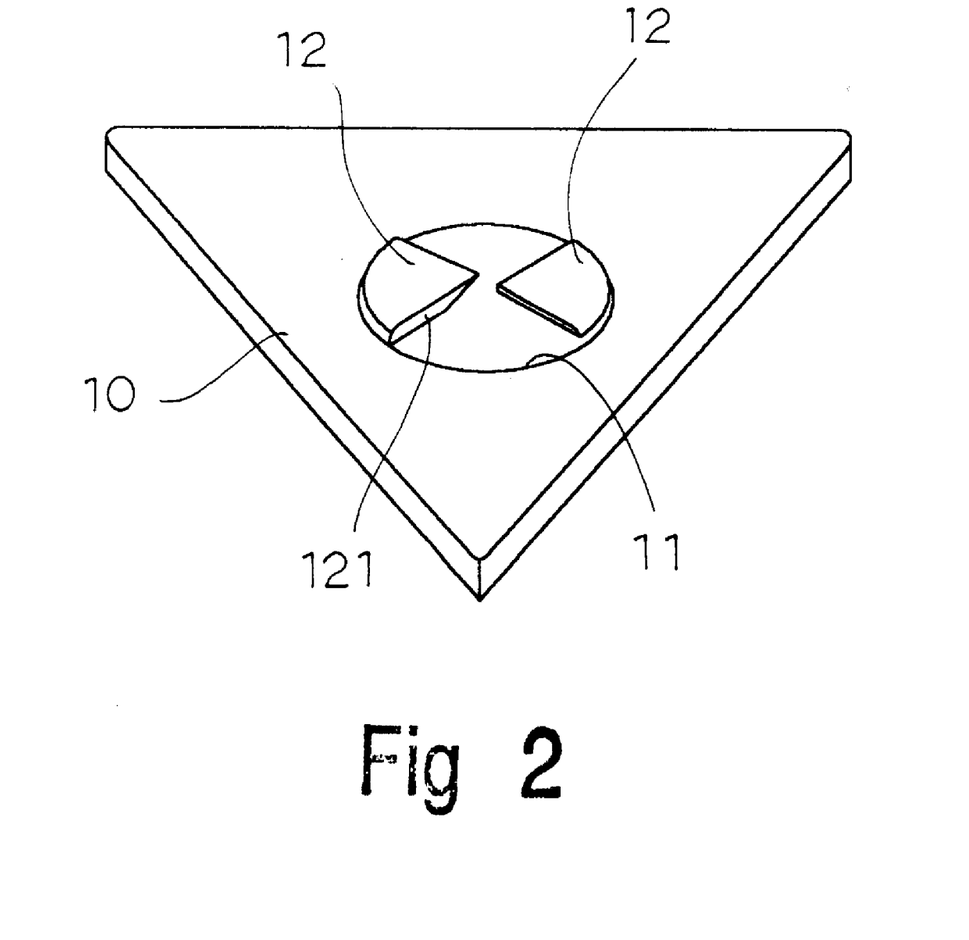
FIG. 2 is a perspective view of the lower board of the first embodiment of the present invention.

Please refer to FIGS. 1 and 2. The present invention includes a detachable fixing seat 1 and a decorative article 3. The fixing seat 1 includes two triangular boards 10, 20. The surface of the lower board 10 is formed with a central circular hole 11. Two opposite connecting wings 12 are formed in the circular hole 11 and slightly protrude beyond the surface of the lower board 10. Two oblique sides of the connecting wing 12 are formed with slopes 121 as shown in FIG. 2. The bottom face is provided with double-face adhesive tape 13 for adhering to a certain place. The upper board 20 is formed with a central through hole 21 corresponding to the circular hole 11. Two opposite projecting tongues 22 are formed in the through hole 21 and slightly downward protrude from the upper board 20. Two oblique sides of the projecting tongue 22 are also formed with slopes 221. Each corner of the upper board 20 is formed with an orifice 23 for locking with the decorative article 3 by screws.

Figure 3:
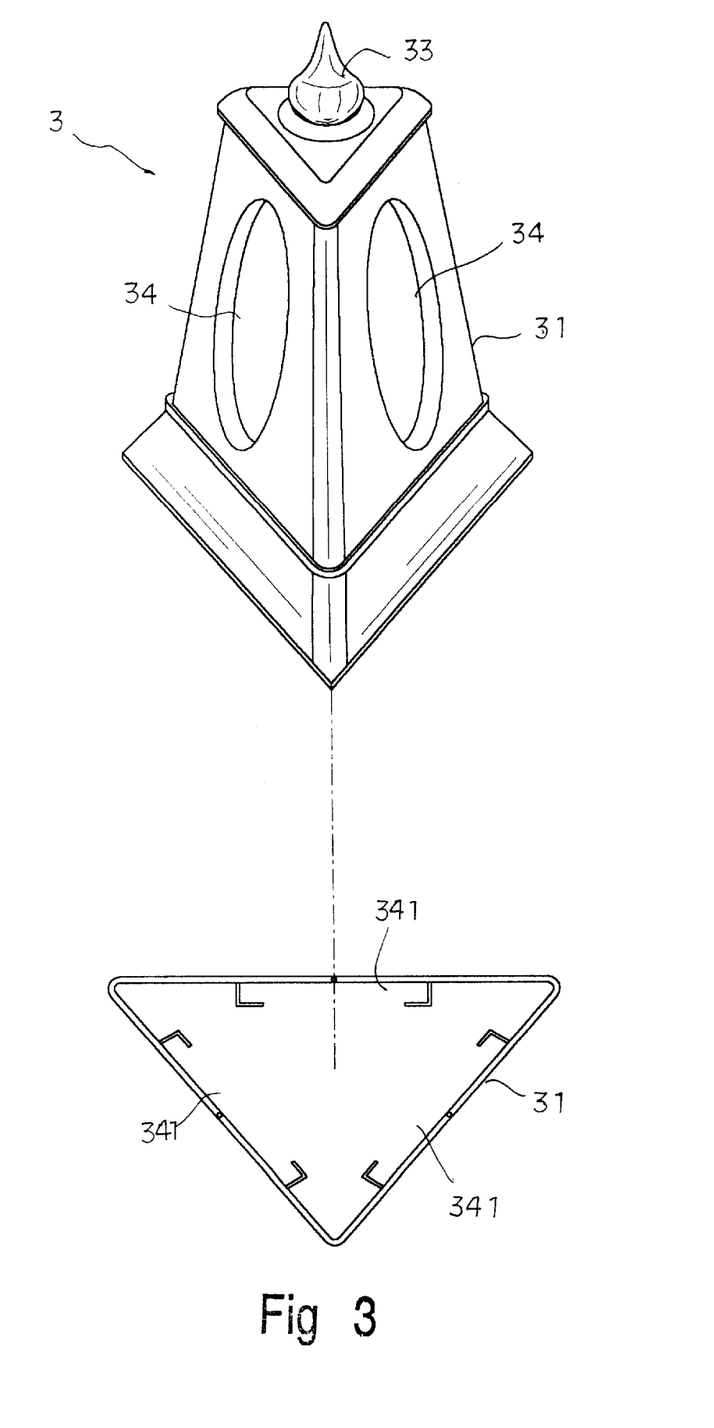
FIG. 3 is a perspective assembled view of the first embodiment of the present invention.

In FIG. 1, the decorative article 3 includes a perfume bottle 30 and an outer casing 31 in which the perfume bottle 30 is fitted. A press sprayer 32 is disposed at the top of the perfume bottle 30. A cap 33 is disposed above the sprayer 32. Each face of the outer casing 31 is formed with inlay window 34. The bottom of the outer casing 31 is formed with openings 341 and thread holes 343 and provided with stop plates 342 fixed by screws as shown in FIG. 3. Pictures can be inlaid in the inlay windows 34 and the stop plates 342 prevent the pictures from dropping.

Figure 4:
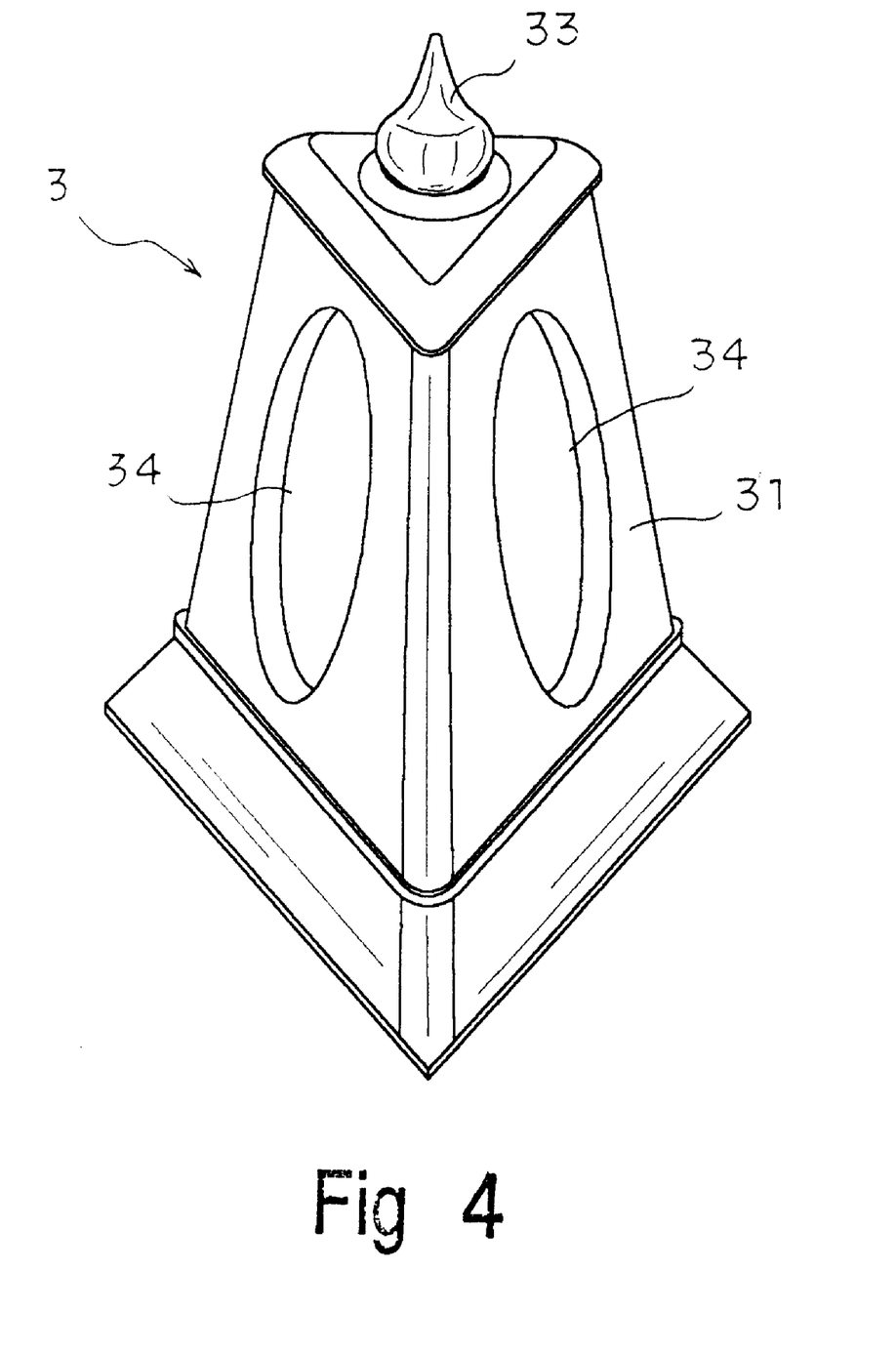
FIG. 4 is a bottom view of the first embodiment of the present invention.
Figure 5:
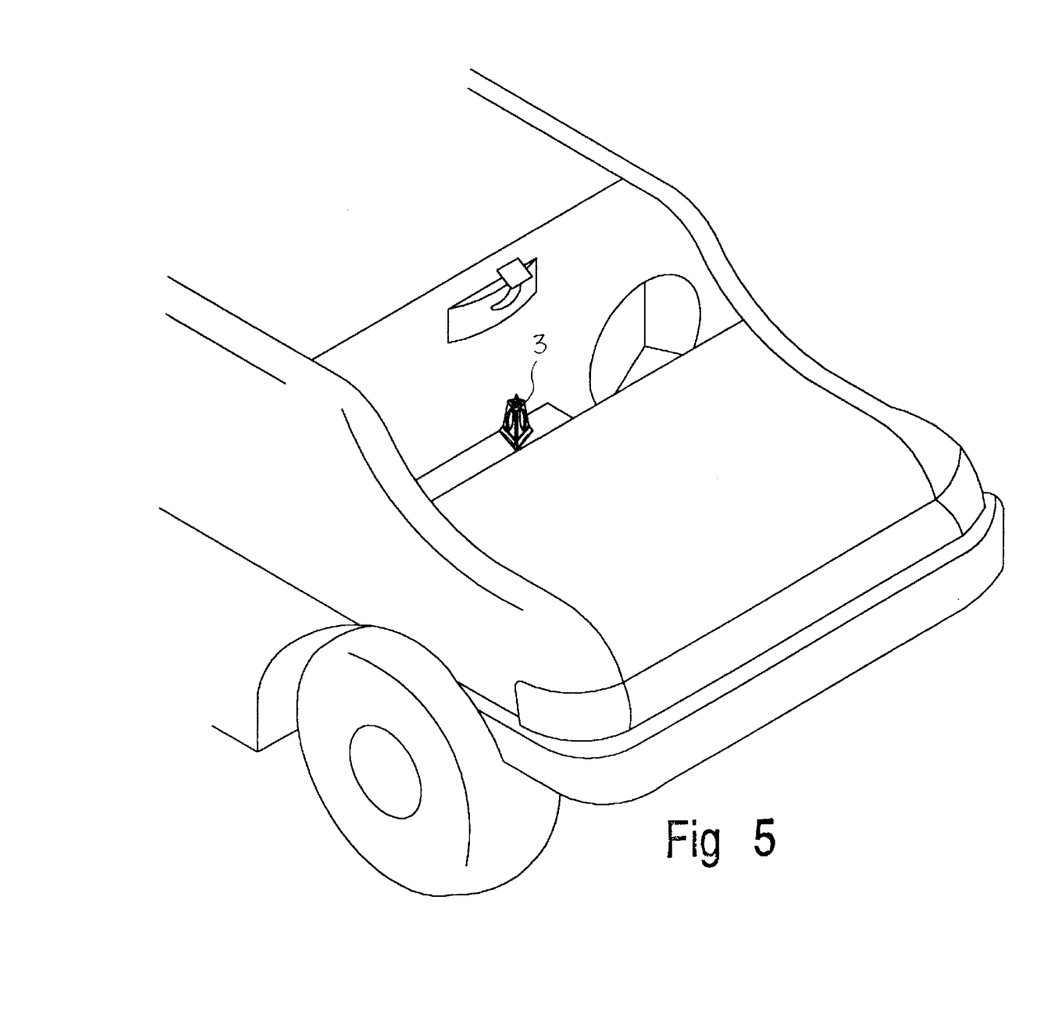
FIG. 5 shows the application of the first embodiment of the present invention.

The above components can be quickly detachably assembled to form a decorative article 3 as shown in FIG. 4. Referring to FIG. 5, in use, by means of the double-face adhesive tape 13 of the bottom of the lower board 10, the fixing seat 1 can be adhered to a desired place. The decorative article 3 is connected with the upper board 20. The central through hole 21 of the upper board 20 overlaps the central circular hole 11 of the lower board 10 and turned relative thereto, whereby the projecting tongues 22 are engaged with the connecting wings 12 to associate the decorative article 3 with the fixing seat 1. When the perfume bottle is exhausted, the decorative article 3 can be detached and replaced. The decorative article 3 also achieve a decoration effect.

Figure 6:
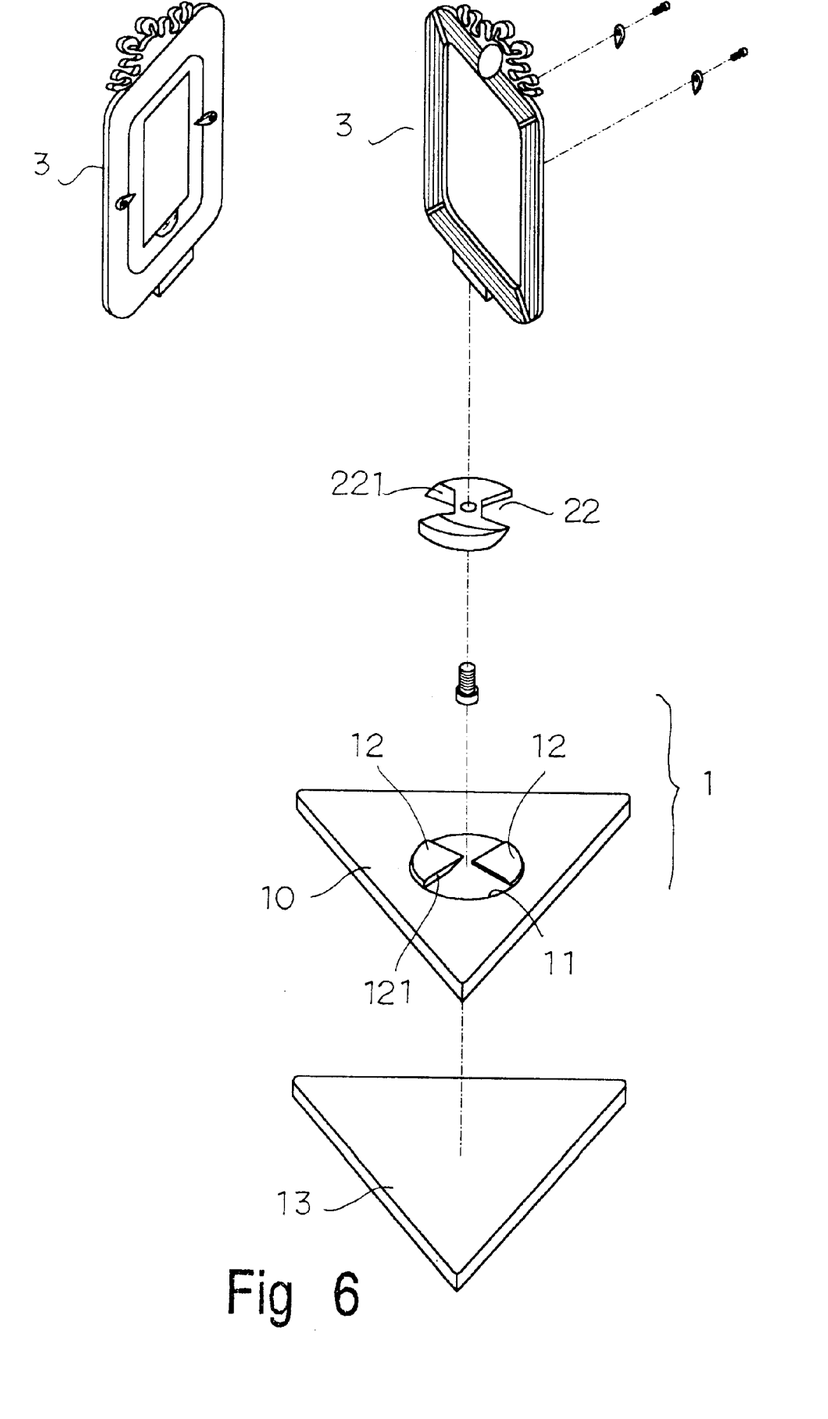
FIG. 6 is a perspective exploded view of a second embodiment of the present invention.
Figure 7:
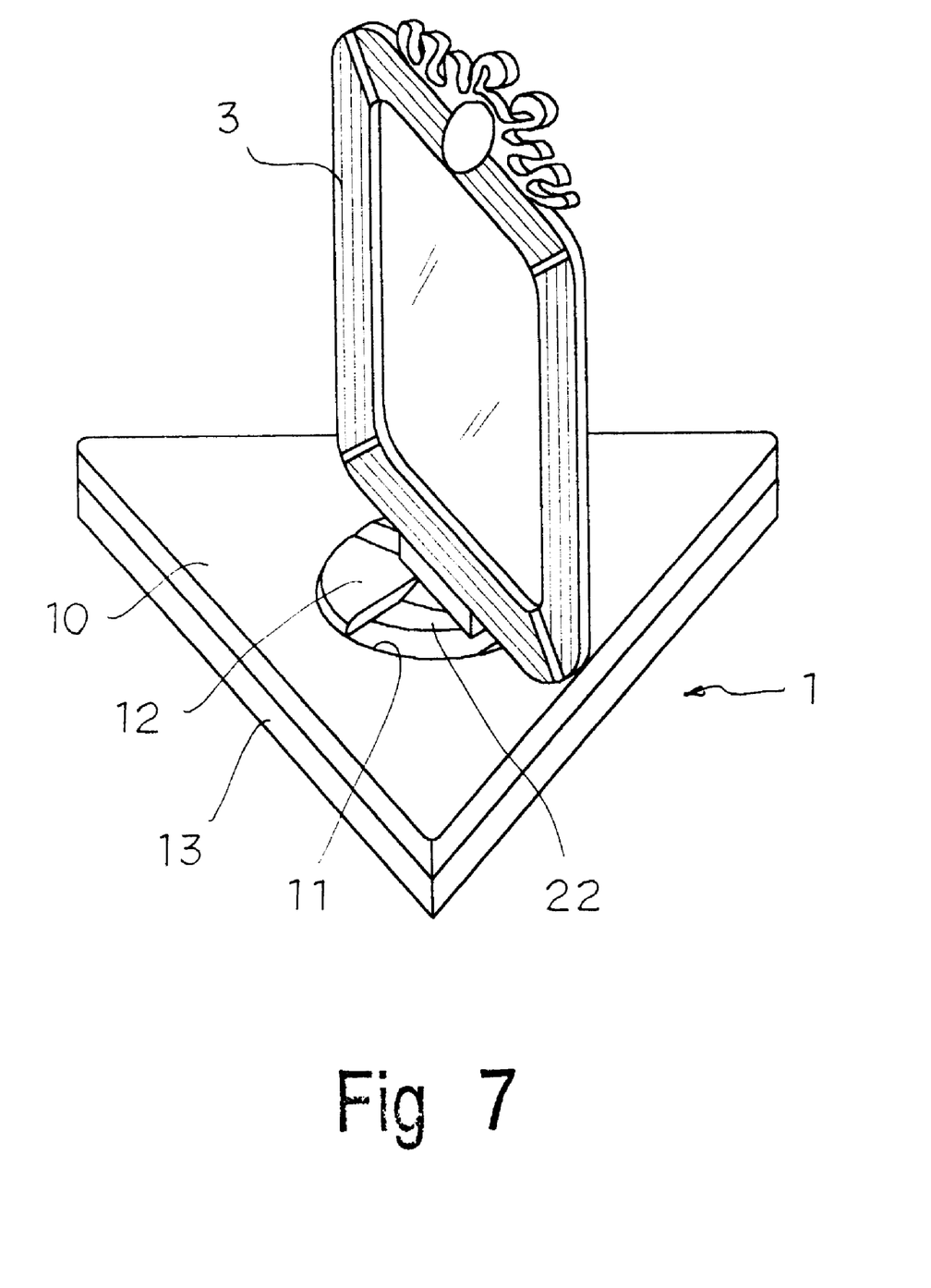
FIG. 7 is a perspective assembled view of the second embodiment of the present invention.
Figure 8:
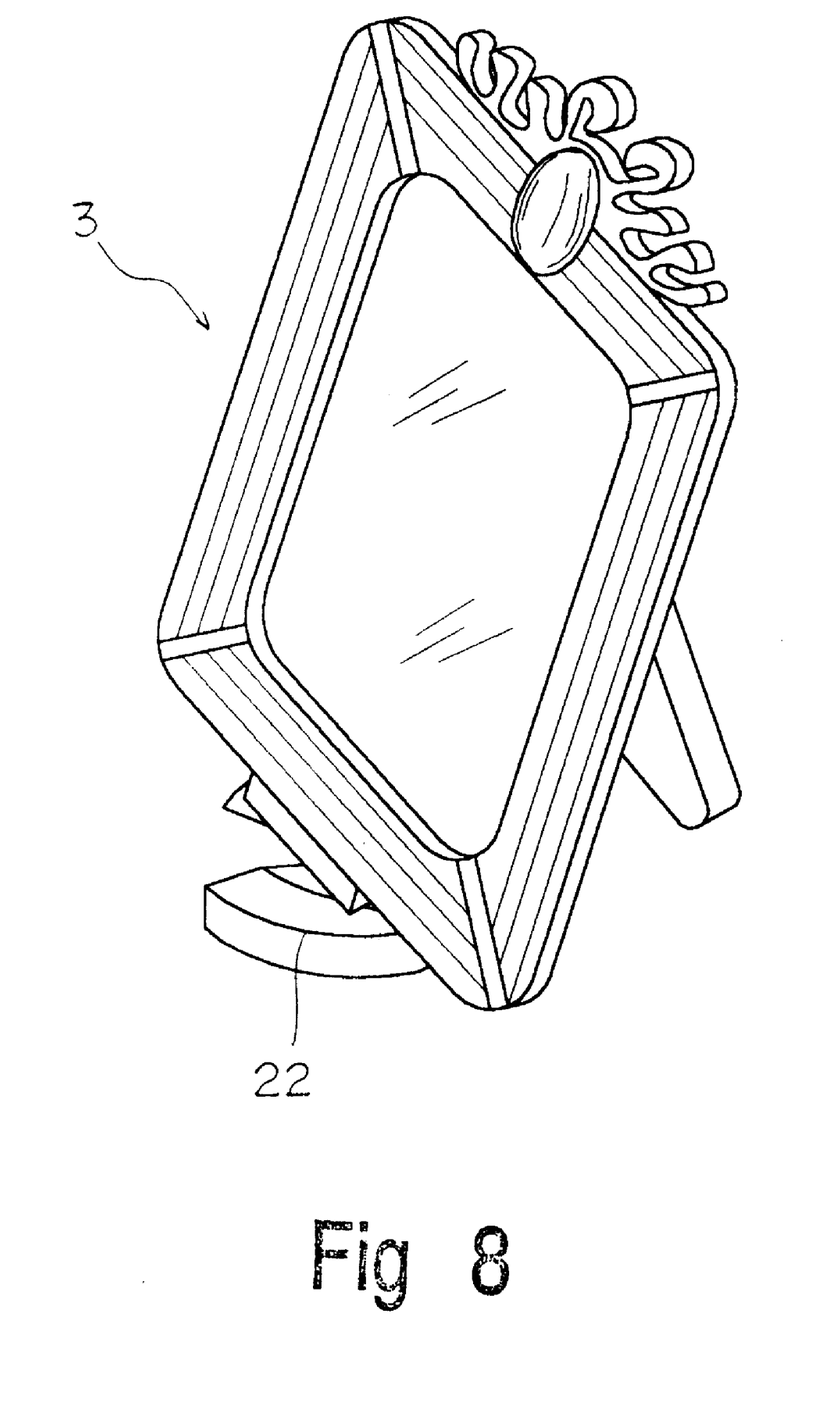
FIG. 8 is a perspective assembled view of the second embodiment of the present invention in another state.
Figure 9:
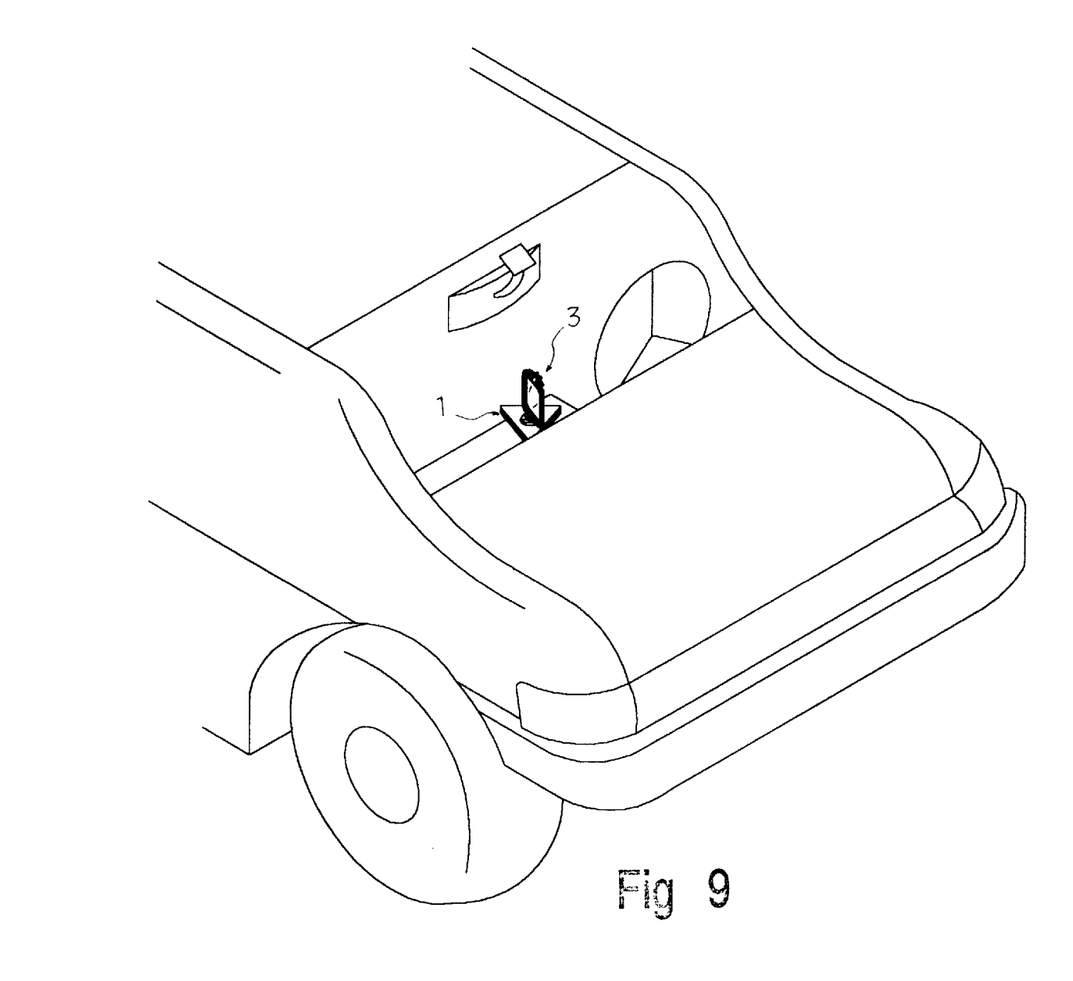
FIG. 9 shows the application of the second embodiment of the present invention.

FIG. 6 shows another embodiment of the present invention, in which the lower board 10 of the fixing seat 1 has the same structure and is formed with a central circular hole 11. Two opposite connecting wings 12 are formed in the circular hole 11. Two oblique sides of the connecting wing 12 are formed with slopes 121. The bottom face is provided with double-face adhesive tape 13 for adhering to a certain place. The upper board 20 is replaced by an upper member having two opposite projecting tongues 22 integrally connected with each other. Two oblique sides of the projecting tongue 22 are also formed with slopes 221. The upper member 20 is locked with the decorative article 3 by screws. The decorative article 3 is a photograph frame. The bottom thereof is connected with the upper board 20. In use, by means of the double-face adhesive tape 13 of the bottom of the lower board 10, the fixing seat 1 can be adhered to a desired place. The decorative article 3 is then quickly and easily replaceably associated with the fixing seat 1 as shown in FIG. 9.

Figure 10:
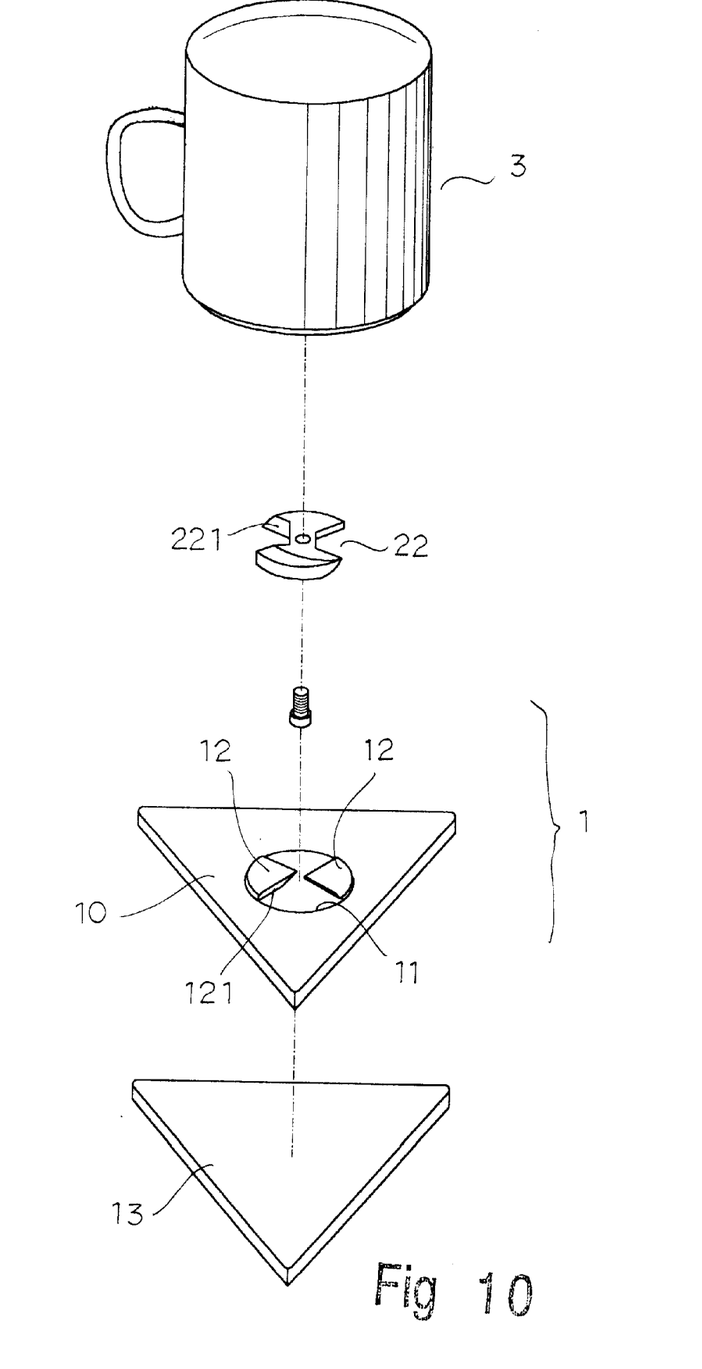
FIG. 10 is a perspective exploded view of a third embodiment of the present invention.
Figure 11:
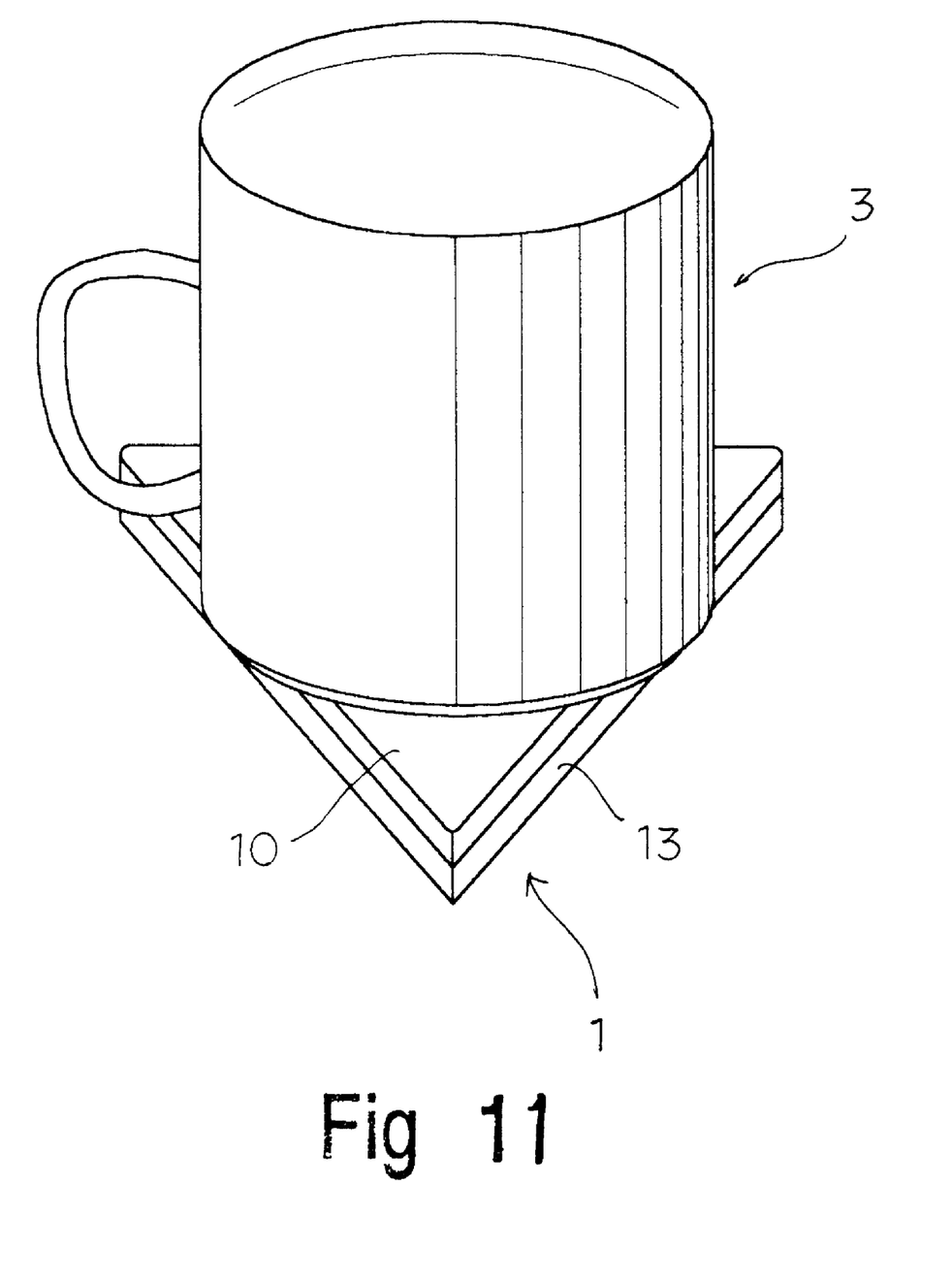
FIG. 11 is a perspective assembled view of the third embodiment of the present invention.

FIGS. 10 and 11 show still another embodiment of the present invention, which is identical to the second embodiment. However, the decorative article 3 is a cup. The plane bottom of the cup is locked with the upper member 22 by screws. Similarly, the cup can be quickly and easily replaceably associated with the fixing seat 1.

Figure 12:
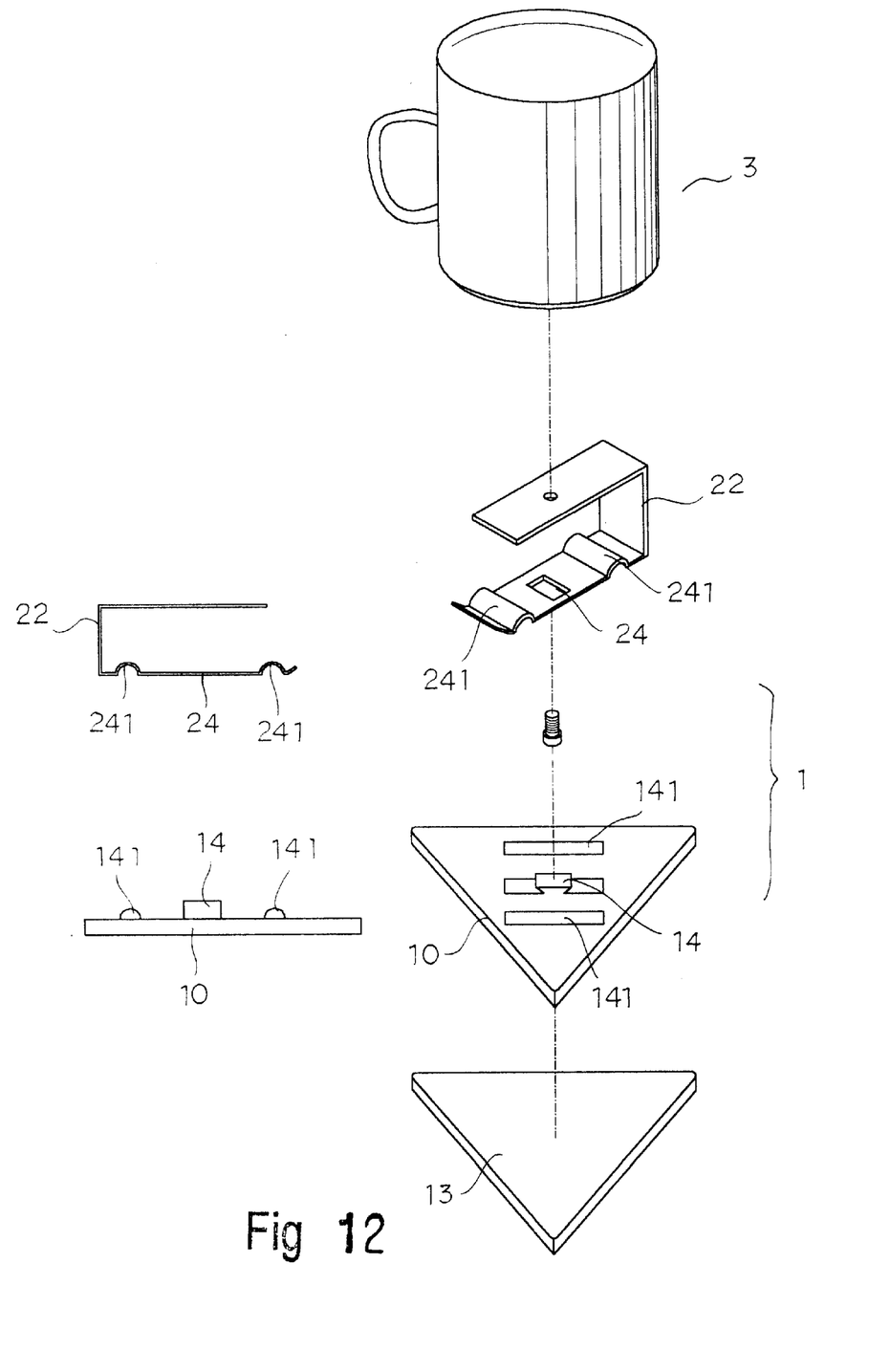
FIG. 12 is a perspective exploded view of a fourth embodiment of the present invention.
Figure 13:
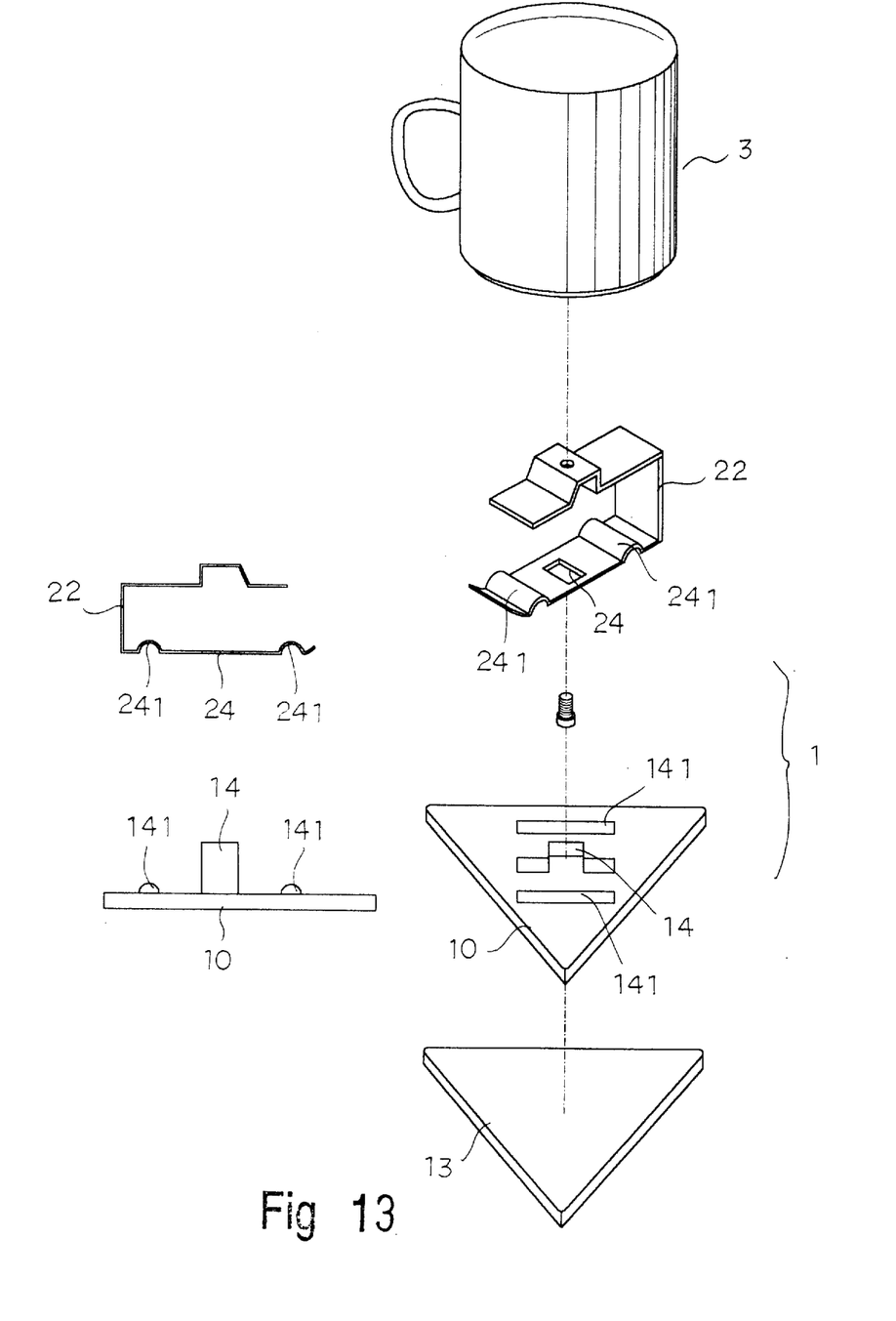
FIG. 13 is a perspective exploded view of a fifth embodiment of the present invention.

FIGS. 12 and 13 show still another embodiment of the present invention, in which the decorative article 3 is a cup with recessed bottom which cannot be directly locked with the upper member 22 by screws. Under such circumstance, the upper member is a U-shaped plate 22. The upper half of the U-shaped plate 22 is locked with the cup by screws. The lower half thereof is formed with a central rectangular hole 24. Two sides of the rectangular hole 24 are formed with arched engaging sections 241. The center of the surface of the lower board 10 is formed with a projecting dovetail connecting section 14. Two sides of the connecting section 14 are formed with ribs 141. The rectangular hole 24 and arched engaging sections 241 of the U-shaped plate 22 are engaged with the connecting section 14 and ribs 141 of the lower board 10 so that the cup can be quickly and easily replaceably associated with the fixing seat. In FIG. 13, the upper half of the U-shaped plate 22 is modified into a trapezoid pattern in accordance with the bottom of the cup 3. The bottom of the cup 3 is locked with the U-shaped plate 22 by screws. The connecting section 14 of the lower board 10 is alternatively a rectangular boss. Similarly, the cup can be quickly and easily replaceably associated with the fixing seat.

The above embodiments are only used to illustrate the present invention, not intended to limit the scope thereof. Many modifications of the above embodiments can be made without departing from the spirit of the present invention.

What is claimed is:

1. Detachable fixing seat comprising:
    a detachable fixing seat including two triangular boards, the surface of a lower board being formed with a central circular hole, two opposite connecting wings being formed in the circular hole, two oblique sides of each connecting wing being formed with slopes, a bottom face of the lower board being provided with double-face adhesive tape for adhering to a certain place, an upper board being formed with a central through hole corresponding to the circular hole, two opposite projecting tongues being formed in the through hole for engaging with the connecting wings of the lower board, two oblique sides of each projecting tongue being formed with slopes; and
    a decorative article including a perfume bottle and an outer casing in which the perfume bottle is fitted, the bottom of the decorative article being locked with the upper board by screws.

2. Detachable fixing seat comprising:
    a detachable fixing seat including a lower board, the surface of the lower board being formed with a central circular hole, two opposite connecting wings being formed in the circular hole, two oblique sides of each connecting wing being formed with slopes, a bottom face of the lower board being provided with double-face adhesive tape, the fixing seat further including an upper member having two opposite projecting tongues integrally connected with each other for engaging with the connecting wings, two oblique sides of each projecting tongue being formed with slopes; and
    a decorative article which is a photograph frame, the bottom of the decorative article being locked with the upper member by screws.

3. Detachable fixing seat as claimed in claim 1 or 2, wherein the decorative article is a cup having a plane bottom which is locked with the upper member by screws.

4. Detachable fixing seat as claimed in claim 1 or 2, wherein the decorative article is a cup with recessed bottom, the upper member being a U-shaped plate, an upper half of the U-shaped plate being locked with the cup by screws, a lower half thereof being formed with a central rectangular hole, two sides of the rectangular hole being formed with arched engaging sections, the center of the surface of the lower board being formed with a projecting dovetail connecting section, two sides of the connecting section being formed with ribs.

5. Detachable fixing seat as claimed in claim 4, wherein the upper half of the U-shaped plate is modified into a trapezoid pattern and the bottom of the cup is locked with the U-shaped plate by screws, the connecting section of the lower board being a rectangular boss.

* * * * *